(12) United States Patent
Huang et al.

(10) Patent No.: US 8,805,369 B2
(45) Date of Patent: Aug. 12, 2014

(54) TECHNIQUES FOR REPORTING AND SIMULTANEOUS TRANSMISSION MECHANISM TO IMPROVE RELIABILITY OF SIGNALING

(75) Inventors: Leping Huang, Tokyo (JP); Kodo Shu, Kanagawa-Ken (JP); Tero Henttonen, Espoo (FI)

(73) Assignee: Nokia Corporation, Espoo (FI)

( * ) Notice: Subject to any disclaimer, the term of this patent is extended or adjusted under 35 U.S.C. 154(b) by 1084 days.

(21) Appl. No.: 12/075,508

(22) Filed: Mar. 12, 2008

(65) Prior Publication Data
US 2008/0227456 A1    Sep. 18, 2008

Related U.S. Application Data

(60) Provisional application No. 60/906,432, filed on Mar. 12, 2007.

(51) Int. Cl.
*H04W 36/00* (2009.01)

(52) U.S. Cl.
USPC ........... 455/436; 455/437; 455/438; 455/439; 455/440; 455/441

(58) Field of Classification Search
USPC .......................................................... 455/436
See application file for complete search history.

(56) References Cited

U.S. PATENT DOCUMENTS

| | | | | |
|---|---|---|---|---|
| 6,496,493 | B1 * | 12/2002 | Chung | 370/332 |
| 6,539,227 | B1 * | 3/2003 | Jetzek et al. | 455/442 |
| 7,239,875 | B2 * | 7/2007 | Bernhard et al. | 455/443 |
| 7,424,296 | B2 * | 9/2008 | Schwarz et al. | 455/442 |
| 7,525,948 | B2 * | 4/2009 | Schwarz et al. | 370/350 |
| 7,701,921 | B2 * | 4/2010 | Cho et al. | 370/349 |
| 2001/0026541 | A1 | 10/2001 | You et al. | 370/331 |
| 2003/0013454 | A1 * | 1/2003 | Hunzinger | 455/452 |
| 2005/0048975 | A1 * | 3/2005 | Ranta-Aho et al. | 455/438 |
| 2007/0047493 | A1 | 3/2007 | Park et al. | 370/331 |
| 2010/0135156 | A1 * | 6/2010 | Sarkar | 370/230 |

FOREIGN PATENT DOCUMENTS

CN    1791270 A    6/2006

OTHER PUBLICATIONS

"High Level Comparison of Handover in GSM, UMTS and LTE", 3GPP TSG-RAN WG2 meeting #56bis, R2-070213, Jan. 2007, pp. 1-7.
"Simulation Results on Forward Handover", 3GPP TSG-RAN WG2 meeting #56, R2-063281, Nov. 2006, pp. 1-10.
"Radio Resource Control (RRC); Protocol Specification (Release 7)", 3GPP TS 25.331 V.7.3.0, 2006, 66 pgs.

(Continued)

*Primary Examiner* — Huy C Ho
(74) *Attorney, Agent, or Firm* — Harrington & Smith (57) ABSTRACT

Methods, apparatus and computer program products perform signal quality measurements for signals from a plurality of cells served by an apparatus, and transmit indications of the signal quality measurements to the apparatus. The signal quality measurements may include CQI measurements. Transmitting may include transmitting indications of the signal quality measurements to a source cell of the apparatus. Other methods, apparatus and computer program products perform signal quality measurements for signals from a plurality of cells served by an apparatus, determine, using at least the signal quality measurements, a frequency band to be used by each of the plurality of cells to transmit a command, and transmit an indication of the frequency band to the apparatus. Variants may include receiving over the frequency band the command from each of the plurality of cells.

33 Claims, 4 Drawing Sheets

(56) References Cited

OTHER PUBLICATIONS

"Evolved Universal Terrestrial Radio Access (E-UTRA) and Evolved Universal Terrestrial Radio Access Network (E-UTRAN); Overall description; Stage 2 (Release 8)", 3GPP TS 36.300 V0.5.0, 2007, 72 pgs.

"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 0.4.0); ETSI TS 136 300" No. V0.4.0, Jan. 2007, pp. 1-76, XP002485085.

Alcatel Lucent: "Reliability considerations for handover command R2-070601" Feb. 16, 2007, pp. 1-6, XP002494267.

* cited by examiner

FIG.4

TECHNIQUES FOR REPORTING AND SIMULTANEOUS TRANSMISSION MECHANISM TO IMPROVE RELIABILITY OF SIGNALING

CROSS REFERENCE TO A RELATED U.S. PATENT APPLICATION

This application hereby claims priority under 35 U.S.C. §119(e) from copending provisional U.S. Patent Application No. 60/906,432 entitled "TECHNIQUES FOR REPORTING AND SIMULTANEOUS TRANSMISSION MECHANISM TO IMPROVE RELIABILITY OF SIGNALING" filed on Mar. 12, 2007 by Leping Huang, Kodo Shu and Tero Henttonen. This preceding provisional application is hereby incorporated by reference in its entirety as if fully restated herein.

TECHNICAL FIELD

This invention relates generally to wireless networks and, more specifically, relates to signaling reliability for signals communicated to user equipment in wireless networks.

BACKGROUND

There are a number of different types of handovers that are used to transfer a user equipment (UE), such as a cellular telephone, from one base station to another. For base stations, such as Node Bs or evolved Node Bs (eNBs), that serve multiple cells (also called sectors), handovers occur between cells of the base stations. Typical terminology used includes soft handovers (using a make-before-break technique) and hard handovers (using a break-before-make technique). Soft handover versus hard handover concerns whether the UE connects to a single base station (hard handover) or multiple base stations (soft handover) at the time of the handover. Consequently, a soft handover is a handover that occurs between different base stations and where radio links are added and abandoned in such a manner that the user equipment always maintains at least one radio link to the radio access network. Thus, a connection is made with the new, target cell prior to a break from the original, source cell. It should be noted that a soft handover is always, an intra-frequency handover. In a hard handover, the UE breaks connection with the source cell prior to transitioning to and receiving from a target cell.

Further terminology includes backward and forward handovers. The terms "backward" or "forward" describe whether a handover (HO) command originates from source cell (backward HO) or target cell (or UE) (forward HO).

This terminology may also be combined. For instance, UMTS (universal mobile telecommunications system) uses backward, soft handover. A discussion of soft handovers in UTRAN (UMTS terrestrial radio access network) is given in 3GPP TS 25.331, v7.3.0, section 8.3. E-UTRAN (evolved UMTS terrestrial radio access network), also called 3.9G (generation 3.9) or LTE (long term evolution), currently uses backward, hard handover.

E-UTRAN is a transmission system based on packet data. This system supports intra-frequency, inter-frequency and intra-RAT (radio access technology) HO. It has been agreed that LTE will use a break-before-make, backward handover. Soft handovers are not expected to be used for LTE at the current time.

Concerning inter-frequency HOs, an intra-frequency handover is triggered when a UE is in the cell edge of current serving cell. By contrast, softer handover (e.g., intra-eNB) is a vendor implementation issue. A softer HO is a handover occurring between cells (i.e., sectors) only at the source cell. A softer HO is a make-before-break handover technique, and is an intra-frequency handover which occurs between cells (i.e., sectors) within one base station and where the radio links are added and abandoned in such manner that the user equipment always maintains at least two radio links to the base station.

In a frequency reuse-1 system (meaning that the entire allotted frequency spectrum is used) such as LTE, a UE may experience strong interference and low SINR (signal to noise and interference ratio) (e.g., less than −5 dB) in DL (downlink) when the UE is in the cell edge. Given such low SINR, the BLER (block error rate) of received data after ARQ (automatic repeat-request) and HARQ (hybrid ARQ) processes tends to be very low in some scenarios (e.g., UE crossing the corners with certain vehicular speeds such as greater than 30 km/hr, kilometers per hour). This raises concerns as to whether HO execution signaling (e.g., mainly HO command in DL, downlink) can be reliably communicated between eNBs and UEs. For instance, see details in the contributions R2-063281, R2-070213. In other words, this raises the concern whether there is a coverage problem in terms of HO execution signaling in LTE.

It is believed that the rate of failure of HO commands may be very high in some worse case scenarios, such as high mobility (UE speed >30 km/hour), one receiver (e.g., UE) antenna, and fully loaded scenarios. If the transmission (and reception) of the HO command fails, the UE will move to the idle state, and start cell reselection. The whole procedure due to the failure of HO command will cause a long (e.g., >500 milliseconds) interruption time. This is not a tolerable value for an LTE system.

As a result, it is necessary to improve the reliability of HO command signaling and other command signaling.

SUMMARY OF THE INVENTION

An embodiment of the invention is an electronic device comprising: radio apparatus configured to perform bidirectional communication operations in a wireless communications network; a measurement module configured to perform signal quality measurements for signals received by the electronic device from a plurality of cells served by another electronic device operative in the wireless communications network; and a controller configured to operate the radio apparatus to transmit indications of the signal quality measurements to the other electronic device.

Another embodiment of the invention is a method comprising: at user equipment operative in a wireless communications network, determining that a handoff measurement event has been triggered; performing signal quality measurements of signals received in a serving cell and at least one other cell associated with a serving base station in response to the detection of the handoff measurement event; communicating signal quality information generated during the signal quality measurements of signals received in the serving cell and the at least one other cell to the serving base station associated with the serving cell and at least one other cell; and receiving at the user equipment a handoff command signal transmitted in both the serving cell and the at least one other cell, wherein the handoff command signals transmitted in the serving cell and the at least one other cell were formulated together using the signal quality information concerning the signals received in the serving cell and the at least one other cell.

A further embodiment of the invention comprises a computer program product comprising a computer readable memory medium embodying a computer program, the computer program configured to operate user equipment in a wireless communications network when executed, wherein when the computer program is executed the user equipment is configured to determine that a handoff measurement event has been triggered; to perform signal quality measurements of signals received in a serving cell and at least one other cell associated with a serving base station in response to the detection of the handoff measurement event; to communicate signal quality information generated during the signal quality measurements of signals received in the serving cell and the at least one other cell to the serving base station associated with the serving cell and at least one other cell; and to receive at the user equipment a handoff command signal transmitted in both the serving cell and the at least one other cell, wherein the handoff command signals transmitted in the serving cell and the at least one other cell were formulated together using the signal quality information concerning the signals received in the serving cell and the at least one other cell.

Yet another embodiment of the invention is an electronic device comprising: radio apparatus configured to perform bidirectional communication operations in a wireless communications network; a scheduler configured to perform signal transmission scheduling in the wireless communications network; and a controller configured to operate the radio apparatus to receive channel quality information transmitted by another electronic device operative in the wireless communications network, the channel quality information concerning channel conditions of a serving cell and at least one other cell operative in the wireless communications network; to use the channel quality information and scheduler to schedule a signal to be transmitted in a communications channel in each of the serving cell and the at least one other cell; and to operate the radio apparatus to transmit the signal in the communications channels in each of the serving cell and the at least one other cell to the other electronic device.

A still further embodiment of the invention is a method comprising: accessing indications of signal quality measurements for a plurality of cells served by an apparatus, determining, using at least the indications of signal quality measurements, at least a frequency band to use for the plurality of cells to transmit a command, and causing the command to be communicated using the frequency band by each of the plurality of cells.

Another embodiment of the invention is a computer program product comprising a computer readable memory medium embodying a computer program, the computer program configured to perform operations when executed to control an electronic device operative in a wireless communications network, wherein when the computer program is executed the electronic device is configured to access indications of signal quality measurements for a plurality of cells served by an apparatus, to determine, using at least the indications of signal quality measurements, at least a frequency band to use for the plurality of cells to transmit a command, and to cause the command to be communicated using the frequency band by each of the plurality of cells.

A further embodiment of the invention is an electronic device comprising: radio means for performing bidirectional communication operations in a wireless communications network; measurement means for performing signal quality measurements for signals received by the electronic device from a plurality of cells served by another electronic device operative in the wireless communications network; and controller means for determining that a handoff measurement event has been triggered; for operating the measurement means to perform signal quality measurements of signals received in a serving cell and at least one other cell associated with a serving base station in response to the detection of the handoff measurement event; for communicating signal quality information generated during the signal quality measurements of signals received in the serving cell and the at least one other cell to the serving base station associated with the serving cell and at least one other cell; and for operating the radio apparatus means to receive at the user equipment a handoff command signal transmitted in both the serving cell and the at least one other cell, wherein the handoff command signals transmitted in the serving cell and the at least one other cell were formulated together using the signal quality information concerning the signals received in the serving cell and the at least one other cell.

Yet another embodiment of the invention is an electronic device comprising: radio means for performing bidirectional communication operations in a wireless communications network; scheduler means for performing signal transmission scheduling in the wireless communications network; and controller means for operating the radio apparatus to receive channel quality information transmitted by another electronic device operative in the wireless communications network, the channel quality information concerning channel conditions of a serving cell and at least one other cell operative in the wireless communications network; for using the channel quality information and scheduler to schedule a signal to be transmitted in a communications channel in each of the serving cell and the at least one other cell; and for operating the radio apparatus to transmit the signal in the communications channels in each of the serving cell and the at least one other cell to the other electronic device.

BRIEF DESCRIPTION OF THE DRAWINGS

Exemplary embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

It is noted that UMTS is another frequency reuse-i system. In UMTS, backward, soft handover is used to avoid and solve the HO signaling error problems previously described. In terms of Mobility Management in an LTE_ACTIVE state handovers are described in 3GPP (third generation partnership project) TS (technical standard) 36.300, v0.45.0. See, in particular, FIG. 10.1.2.1. Soft handover for LTE has been proposed by Ericsson, and forward handover has been recently proposed by Qualcomm (see discussions above and below). For instance, Qualcomm has proposed forward handover (e.g., UE based mobility in the LTE_ACTIVE state, which is an active state in a UE that is using LTE) as a backup (e.g., alternative) to current backward HO. The main idea of these proposals is to allow a UE to search for a new cell if the UE did not receive, within some timeout period, a HO command the UE previously requested.

The inventors have studied these proposals and believe that the soft HO and forward HO processes proposed by Qualcomm and others require significant architectural changes on the LTE RAN (radio access network). It is believed, therefore, that these proposals are not the best choices that could be made to improve reliability in HO command signaling.

In an exemplary embodiment herein, to improve the reliability of receiving messages such as a special RRC (radio resource control) message (e.g., a HO command), multiple intra-eNB cells can transmit (e.g., using signaling) the RRC messages to a UE at the same time/frequency with the same channel coding via shared data channels. The UE then combines the multiple RRC messages at the UE side. This technique has at least twofold benefits: first, the technique improves the received signal (e.g., SINR (signal to interference plus noise ratio) or RxPower (receiver power)) of the message at UE side; and second, the technique removes two of the strongest interferers from the inter-cell interference. Concerning the latter, assuming there are three cells (also called sectors herein) in the site, the two strongest interferers are the two sectors that also broadcast the RRC messages to the UE. If the two sectors did not broadcast the RRC messages to the UE, they would be broadcasting other information that could interfere with the RRC message broadcast by the third sector. As discussed above, RAN1 has already agreed that such macro-diversity/softer handover techniques as disclosed herein are a vendor dependant issue, and it is difficult to include into a final LTE standard.

Regardless, LTE systems can effectively utilize frequency domain scheduling to explore the frequency diversity/selectivity of the whole bandwidth provided by LTE. In an exemplary embodiment herein, a CQI (channel quality information) reporting mechanism is used to assist the scheduling decision at an eNB. Herein, exemplary solutions are proposed to assist frequency domain scheduling intended for simultaneous transmission of high priority signaling messages such as HO signaling messages.

A possible technique used for comparison can be considered as follows. Assuming that the eNB has three sectors (a sector is a cell in this definition), the eNB schedules the data (e.g., a HO signaling message) based on CQI from the serving cell (called the source cell during a handover) to UE. The other two cells just transmit other data at the same time and frequency resource unit (e.g., resource blocks, RBs) as the serving cell. In this technique, the two other cells act as potential interferers to the transmission by the serving cell.

By contrast, an exemplary embodiment herein provides that the eNB should schedule (e.g., including transmit) the data based on a "combined CQI" measured from multiple intra-eNB cells (e.g., 3 cells in a specific but non-limiting example used herein) by the same UE. The multiple intra-eNB cells therefore transmit the data according to the schedule, and the UE receives the data from the multiple intra-eNB cells. This multiple reception using a schedule based on the "combined CQI" enables the UE to approach the maximum SINR possible for this received data.

Figure 1:
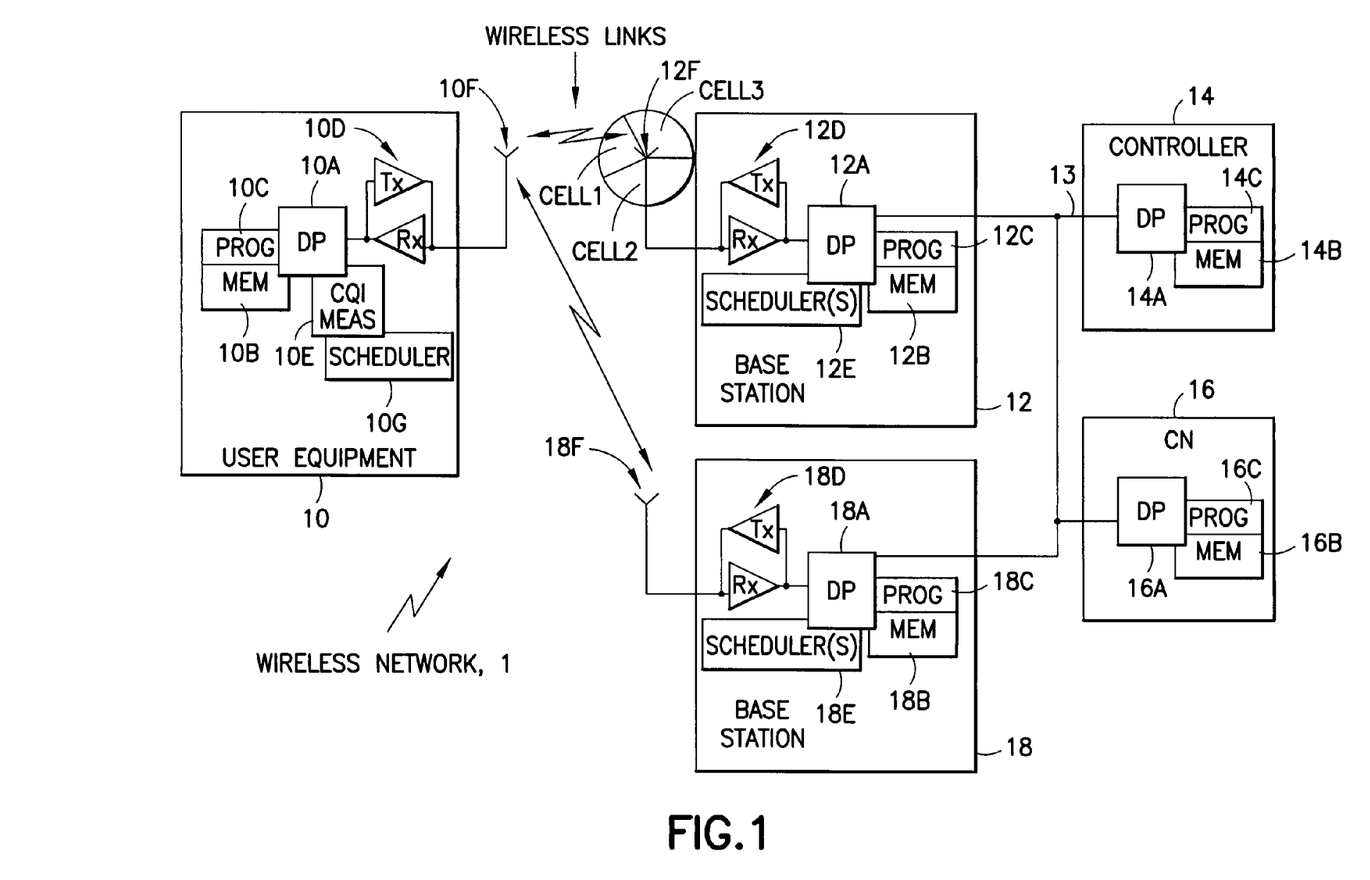
FIG. 1 is a simple block diagram of an exemplary system suitable for practicing the disclosed invention.

Reference is made to FIG. 1 for illustrating a simplified block diagram of various electronic devices that are suitable for use in practicing the exemplary embodiments of this invention. In FIG. 1, a wireless network 1 includes a user equipment 10, a base station 12 and a controller 14 for the wireless network 1. The user equipment 10 includes a data processor (DP) 10A, a memory (MEM) 10B that stores a program (PROG) 10C, and a suitable radio frequency (RF) transceiver 10D (comprising at least one transmitter, Tx, and at least one receiver, Rx) for bidirectional wireless communications using at least one antenna 10F with the base station 12. The base station 12 includes a DP 12A, a MEM 12B that stores a PROG 12C, and a suitable RF transceiver 12D (comprising at least one transmitter, Tx, and at least one receiver, Rx) also coupled to at least one antenna 12F.

In this example, the user equipment 10 is able to communicate with two base stations 12 and 18. The base station (e.g., eNode B) 18 also includes a DP 18A, a MEM 18B that stores a PROG 18C, and a suitable RF transceiver 18D that is coupled to antenna 18F. The base stations 12 and 18 are coupled via a data path 13 to the controller 14 that also includes a DP 14A and a MEM 14B storing an associated PROG 14C. The data path 13 interconnects the controller 14 and the core network (CN) 16, which also includes a DP 16A, and MEM 16B that stores a PROG 16C.

The UE 10 further includes a CQI measuring module 10E, which is configured to measure signal quality of one or more channels (e.g., frequency-based channels) on the wireless links. In an example herein, the CQI measuring module 10E measures SINR for a frequency range over which LTE operates for a number of different cells served by the base stations 12, 18. The CQI measuring module 10E may be implemented as hardware only, or as a combination of software (e.g., executable by DP 10A) and hardware (e.g., DP 10A and other hardware elements).

In another exemplary embodiment, the UE 10 further includes a scheduler 10G. The scheduler 10G uses CQI information from the CQI measuring module 10E and determines appropriate resource blocks (RBs) and timing (and channel codes) for use for receiving HO commands and other commands. Determining appropriate RBs is explained in more detail in reference to FIG. 4. The scheduler 10G may be implemented in hardware or a combination of hardware (e.g., DP 10A) and software (e.g., an executable program having instructions suitable for causing the DP 10A to perform scheduling functions).

The base station 12, e.g., eNB, is in this example serving three cells, cell$_1$, cell$_2$, and cell$_3$. The cells for base station 18 are not shown. The cell, is the serving cell in this example. The base station 12 includes one or more schedulers 12E. There may be one scheduler 12E per cell, or a single scheduler 12E that services all three cells. The scheduler(s) 12E may be implemented in hardware or a combination of hardware and software. Furthermore, if there are multiple schedulers 12E, they may be implemented on different hardware (perhaps with associated software) in the base station 12. If so, then some communication between the different schedulers 12E is beneficial in order to implement the exemplary embodiments herein. It is noted that each cell may also have its own associated transceiver 12D.

For 3G and LTE, the base station 12 includes, for instance, a Node B or evolved Node B, the controller 14 includes, for example, a radio network controller (RNC) or MME (Mobility Management Entity), and the core network 14 includes, e.g., a mobile servicing center/visitor location register, a signaling system seven, a home location register, and a serving GPRS (general packer radio system) support node. 3G typically implements the radio access technology of, e.g., CDMA (code division multiple access) multiplexing and quadrature phase shift keying and binary phase shift keying modulation schemes. However, some 3G systems implement radio access technologies including a combination of TDMA, CDMA, FDMA (frequency division multiple access), and possibly also SDMA (space diversity multiple access) and may use other modulation schemes. LTE is expected to use OFDM based technologies. It is noted that the techniques presented herein use LTE, but LTE is a non-limiting example and the techniques can be applied to other technologies.

As shown in FIG. 1, a Node B or eNB 12, 18 can serve several cells (e.g., cells $cell_1$, $cell_2$, and $cell_3$), also called sectors, depending on the configuration and type of antenna (s) 12F, 18F. Common configurations include omni cell (360 degrees), three sectors each sector assigned 120 degrees (as in the examples herein), or six sectors such as three sectors, each assigned 120 degrees, and overlapping with three other sectors (each assigned 120 degrees) of different frequencies.

In general, the various embodiments of the UE10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Certain embodiments of this invention may be implemented by computer software executable by the DP 10A of the user equipment 10 and the other DPs, or by hardware, or by a combination of software and hardware. The MEMs 10B, 12B, 14B, 16B, and 18B may be of any type suitable to the local technical environment and may be implemented using any suitable data storage technology, such as semiconductor-based memory devices, flash memory, magnetic memory devices and systems, optical memory devices and systems, fixed memory, and removable memory. The DPs 10A, 12A, 14A, 16A, and 18A may be of any type suitable to the local technical environment, and may include one or more of general purpose computers, special purpose integrated circuits, microprocessors, digital signal processors (DSPs) and processors based on a multi-core processor architecture, as non-limiting examples. The MEMs 10B, 12B, 14B, 16B, and 18B may contain machine-readable instructions from a computer program product tangibly embodying a program of the machine-readable instructions, which are executable by at least one data processor 10C, 12C, 14C, 16C, 18C to perform operations described herein. Such a computer program product may include a compact disk (CD), digital versatile disk (DVD), flash memory, memory stick, or any other product suitable for containing a program of machine-readable instructions.

One exemplary aspect of the disclosed invention is directed to how to support handover of the UE 10 from one access area (e.g., serviced by base station 12) to another access area (e.g., serviced by base station 18), where each access area includes one or more cells. Two exemplary approaches to support handover between base stations are described below.

Figure 2:
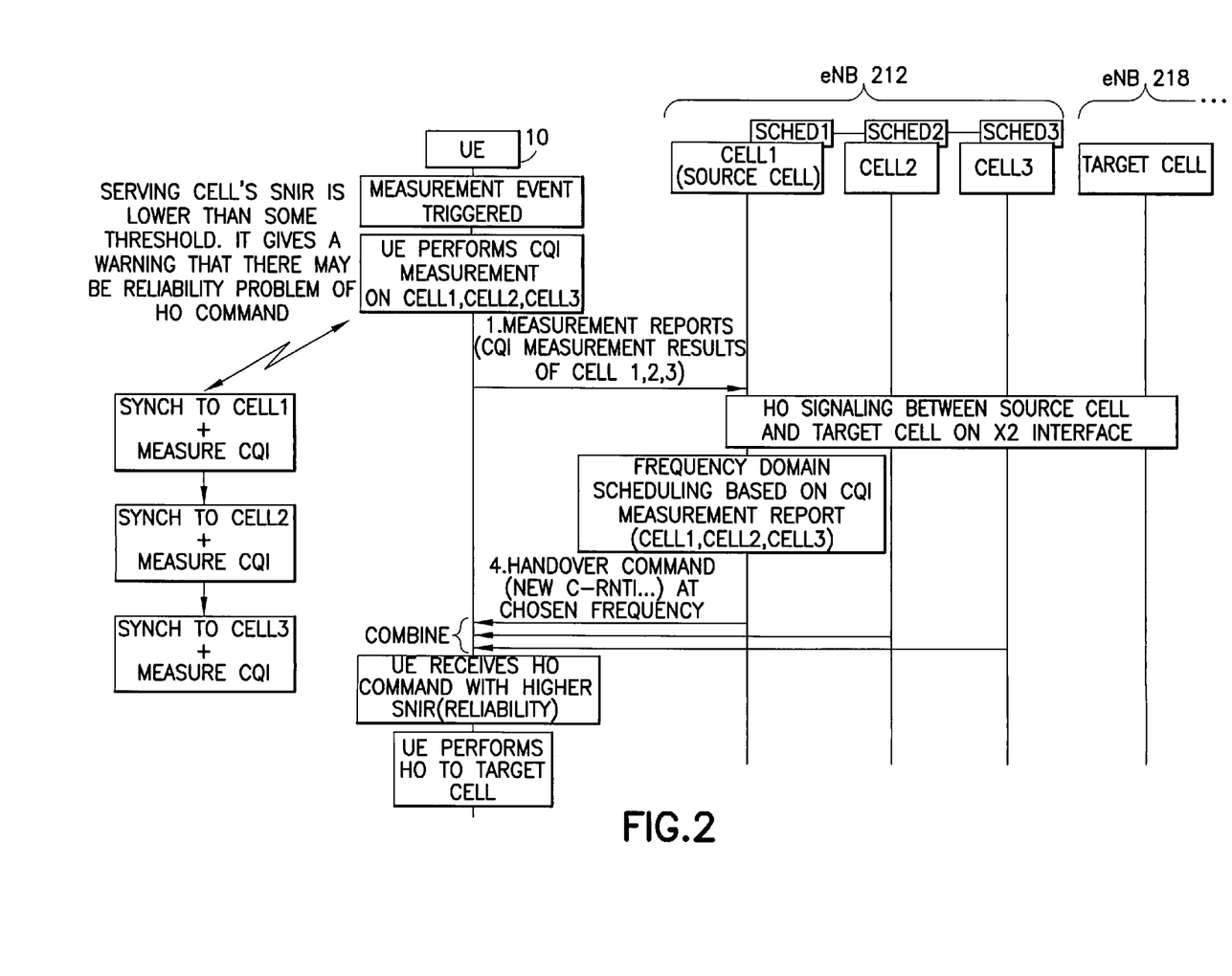
FIG. 2 is a first exemplary signaling diagram for practicing an exemplary embodiment of the disclosed invention.

FIG. 2 below shows a first exemplary approach. A class of HO measurement events is proposed, which has an option to trigger CQI measurement from intra-eNB cells if CQI measurement result of the serving cell is lower than certain threshold. A fixed CQI threshold is a rough indicator of reliability of DL traffic. In FIG. 2, eNB 212 (e.g., base station 12) is shown along with eNB 218 (e.g., base station 18). The UE 10 is to be handed over from the source cell, cell 1 of the eNB 212 to the target cell of the eNB 218. Although not shown, eNB 218 also has, e.g., three cells in this example. It is noted that having three cells is merely one example. In FIG. 2, a HO measurement has been triggered.

If such a HO measurement event is triggered, and CQI measurement results are below the threshold configured by an HO measurement event mentioned above, the UE 10 performs a CQI measurement on intra-eNB cells 2, 3 besides the source cell (i.e., the UE 10 already has performed a CQI measurement from cell 1). The UE 10 reports CQI measurement results of all intra-eNB cells (in this example, cells 1, 2, and 3) to its source cell. In one example, shown in FIG. 2, in order to perform CQI measurements for the cells $cell_1$, $cell_2$, and $cell_3$, the UE 10 synchronizes to cell, and measures CQI (e.g., performs CQI measurements on the bandwidth used for, e.g., LTE). It is noted that the UE 10 already has performed a CQI measurement for $cell_1$, because it has already been determined that the serving cell's SINR (for instance) is lower than a threshold. The UE 10 also synchronizes to $cell_2$ and measures CQI, and synchronizes to $cell_3$ and measures CQI. Other techniques for measuring the CQI from the cells may also be used. For instance, each intra-eNB cell will have its own pilot sequence (e.g., like a signature of cell). These pilot sequences are transmitted at pre-determined positions known by the UE. For CQI measurement on intra-eNB cells, except for current serving cell, if those cells are synchronized with current serving cell, the UE does not need to resynchronize to each of the intra-eNB cells. Instead, the UE 10 directly measures at the pre-determined position to detect the pilot sequences, and measures the signal quality (e.g., signal strength and noise level).

The signal quality, in this example CQI, measurement results are included into a HO measurement report as one non-limiting example. Based on received CQI measurement results, the eNB 212 performs frequency domain scheduling with an objective to optimize SINR at the UE side assuming simultaneous transmission from all intra-eNB cells. In this example, each cell has its own assigned scheduler, $sched_1$ through $sched_3$ (e.g., scheduler 12E), which are linked together. To optimize SINR at the UE side, the scheduler selects, e.g., a frequency band deemed to have high power according to the CQI measurements and an algorithm (e.g., see Approaches 1 and 2 below) for selecting the frequency band, to be used for all the cells to transmit the HO command. Each cell will use the same selected frequency band. It is noted that in general a frequency band may be indicated through use of a single frequency or through a resource block (RB) identification (id). Timing information is also scheduled (e.g., the cells will transmit at a particular time on the assigned frequency band). An RB is defined at least in part by frequency information and includes a frequency band, and may include (e.g., in LTE) a number of sub-carriers. Channel coding (e.g., 16 QAM, quadrature amplitude modulation, QPSK, quadrature phase shift keying, and coding rates such as ⅓ or ¼) may also be scheduled.

Each cell 1-3 in the eNB 212 then communicates a HO command at the chosen frequency (e.g., an RB) and time period, with exactly the same channel code. In an exemplary embodiment, the UE 10 listens (not shown in FIG. 4) for an allocation table (also not shown) just before the RBs (used to communicate the HO commands) in order to determine what RB, timing information (such as time period), and channel coding have been scheduled by the cells 1-3. The UE 10 therefore receives multiple HO commands, which are then combined using, e.g., diversity combination techniques. The combination should yield higher SINR and therefore improve reliability. A subsequent (possible) handover is performed by the UE 10 from the source cell in eNB 212 to the target cell in the eNB 218.

Figure 3:
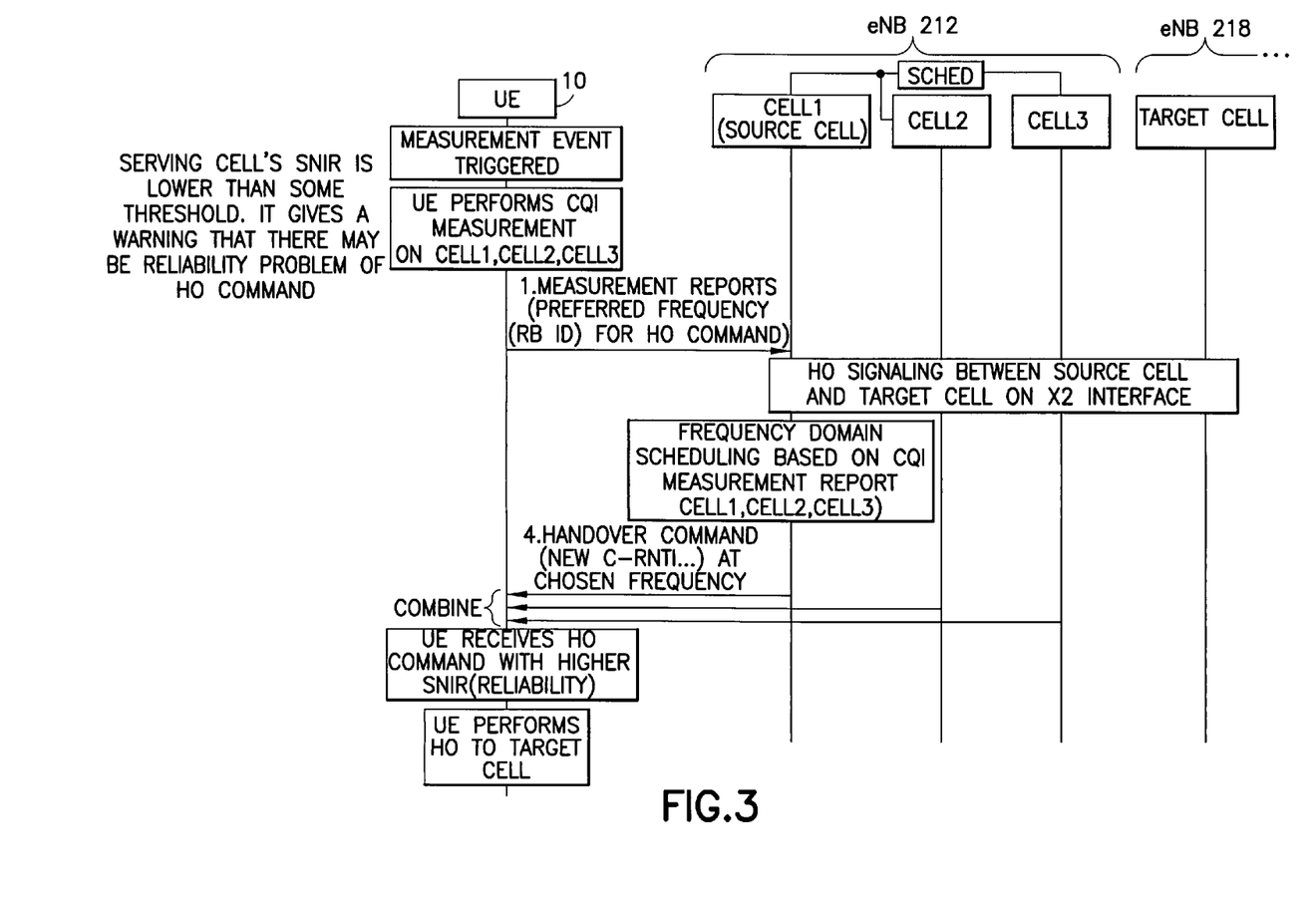
FIG. 3 is a second exemplary signaling diagram for practicing an exemplary embodiment of the disclosed invention.

FIG. 3 shows another exemplary approach. The main difference in FIG. 3 as compared to FIG. 2 regards the information in the measurement report. In this approach, the UE 10 (e.g., scheduler 10G) chooses an optimal frequency locally based on CQI measurement results from all intra-eNB cells 1-3. The scheduler 10G uses information from the CQI measurement module 10E in order to determine an RB for each of the cells to use to transmit the HO commands. The UE 10 only includes the frequency information (e.g., Resource Block identification, RB id) in the measurement report. The scheduler 12E (shown as SCHED in FIG. 3) for the eNB 212 further determines timing information and channel coding for use by the cells 1-3. All intra-eNB cells 1-3 use the received frequency information, timing information, and channel coding to transmit the HO command. In this example, there is also one scheduler, SCHED, for all of the cells.

Figure 4:
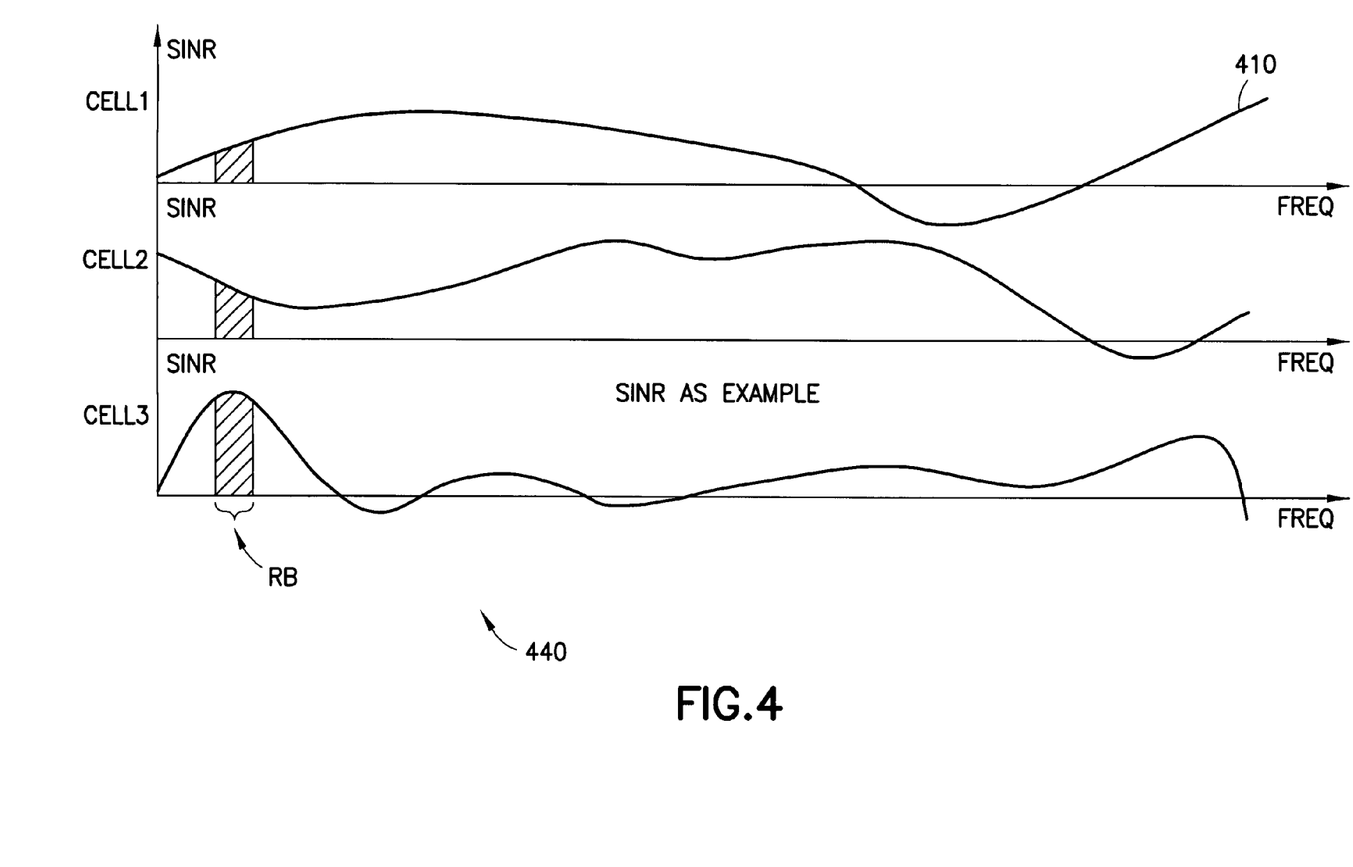
FIG. 4 is one example used to illustrate how to choose a suitable frequency (e.g., corresponding to a frequency band) for simultaneous transmission.

FIG. 4 is one illustration of how a suitable frequency band might be chosen, as in FIGS. 2 and 3, for simultaneous transmission by the cells 1-3. As shown in this figure, SINR signals versus frequency are shown for the cells 1-3. The best frequency band for the source cell (cell 1, line 410) may not be the best frequency for the combination of all intra-eNB cells. The RB selected by a scheduler might be the RB 440 shown, which does not correspond to the highest SINR for cells $cell_1$ and $cell_2$.

Two exemplary approaches for combining SINR from the different cells are as follows:

Approach 1:
Combine the measured CQI (SINR) of different cells at the same frequency bin in raw power level. Choose RB (and associated RBid) with the strongest combined SINR.

Approach 2:
Sort CQI results from all cells based on SINR. Choose RB (resource block) (and associated RBid (resource block identification)) with the strongest SINR within all reports.

It is noted that these approaches for combining SINR or other signal quality measurements and choosing an RBid is an eNB or UE implementation issue, so details of how the combination is performed and the technique for choosing an RBid are not critical.

The exemplary embodiments disclosed above avoid significant architectural changes compared with the soft handover and forward handover approaches. For instance, to implement soft handover, synchronization of transmission between eNBs would have to occur, but this should be a relatively minor modification. Additionally, message flow should be changed, as should the entity that makes the handover decision, relative to what is currently agreed upon (such as in FIG. 10.1.2.1: Intra-MME/UPE HO, 3GPP TS 36.300 v0.45). These changes should also be relatively easy to implement.

It is noted that LTE is merely an example of one possible system for use with the exemplary embodiments herein. Additionally, although HO commands have been primarily used herein, the exemplary embodiments can be extended to include any command (e.g., message) that is to be signaled. Furthermore, CQI measurements are one exemplary type of signal quality measurements and other signal quality measurements may be used instead, or in conjunction with the CQI measurements. Additionally, although the examples above relate to base stations and controllers, these are merely examples and the techniques presented can be applied to other items such as access points and other identities.

In an exemplary embodiment, a method includes performing signal quality measurements for signals from a plurality of cells served by an apparatus, and transmitting indications of the signal quality measurements to the apparatus. In a further exemplary embodiment, the signal quality measurements include CQI measurements. In an additional exemplary embodiment, transmitting includes transmitting indications of the signal quality measurements to a source cell of the apparatus.

In an additional exemplary embodiment, an apparatus includes a transceiver and a measurement module, where the measurement module is configured to perform signal quality measurements for signals from a plurality of cells served by a second apparatus, and where the transceiver is configured to transmit indications of the signal quality measurements to the second apparatus.

In another exemplary embodiment, a method includes performing signal quality measurements for signals from a plurality of cells served by an apparatus, determining, using at least the signal quality measurements, a frequency band to be used by each of the plurality of cells to transmit a command, and transmitting an indication of the frequency band to the apparatus. In another exemplary embodiment, the method includes receiving over the frequency band the command from each of the plurality of cells.

In a further exemplary embodiment, an apparatus includes a transceiver, a scheduler, and a measurement module, where the measurement module is configured to perform signal quality measurements for signals from a plurality of cells served by a second apparatus, where the scheduler is configured to determine, using at least the signal quality measurements, a frequency band to be used by each of the plurality of cells to transmit a command, and where the transceiver is configured to transmit an indication of the frequency band to the second apparatus.

In another exemplary embodiment, a method includes receiving a plurality of commands from a corresponding plurality of cells served by an apparatus, the receiving performed using a frequency band that is the same for receptions for the plurality of commands, combining the plurality of commands, and performing at least one action in response to the combined command. In an additional exemplary embodiment, the command is a handover command and performing includes performing a handover to a target cell indicated by the combined handover command.

In another exemplary embodiment, an apparatus includes a transceiver and a processor, where the transceiver is configured to receive a plurality of commands from a corresponding plurality of cells served by a second apparatus, the reception performed using a frequency band that is the same for the plurality of commands, where the processor is configured to combine the plurality of commands, and is configured to cause at least one action to be performed in response to the combined command.

In yet another exemplary embodiment, a method is disclosed that includes accessing indications of signal quality measurements for a plurality of cells served by an apparatus, determining, using at least the indications of signal quality measurements, at least a frequency band to use for the plurality of cells to transmit a command, and causing the command to be communicated using the frequency band by each of the plurality of cells. In another exemplary embodiment, the method further includes determining a time period and a channel coding and communicating the time period and causing the command to be communicated on the frequency band by each of the plurality of cells during the time period and using the frequency band and channel coding. In a further exemplary embodiment, the method includes receiving the indications.

In yet another exemplary embodiment, an apparatus is disclosed comprising a transceiver and at least one scheduler, the apparatus serving a plurality of cells, the at least one scheduler configured to access indications of signal quality measurements for the plurality of cells, the at least one scheduler configured to determine, using at least the indications of signal quality measurements, at least a frequency band to use for the plurality of cells to transmit a command, and configured to cause the command to be communicated using the frequency band by each of the plurality of cells.

As described above, exemplary embodiments herein can be implemented as a computer program product tangibly embodying a program of machine-readable instructions, which are executable by at least one data processor to perform operations described herein (e.g., in the methods described above).

In general, the various embodiments may be implemented in hardware such as special purpose circuits or logic, software, or any combination thereof. For example, some aspects may be implemented in hardware, while other aspects may be implemented in software (e.g., firmware) which may be executed by hardware such as a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware (e.g., special purpose circuits or logic, general purpose hardware or controller or other computing devices), software (e.g., firmware), or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. An apparatus comprising:
   a processor; and
   a memory including computer program instructions, the memory and the computer program instructions being configured to, with the processor, cause the apparatus at least to perform:
   perform signal quality measurements for a plurality of cells served by a device operative in a wireless communications network that is not using soft handovers, wherein the apparatus is configured to perform bidirectional communication operations in the wireless communications network, wherein the performed signal quality measurements yield measurement results for the plurality of cells;
   transmit at least one indication to the device, wherein the at least one indication comprises at least one of the measurement results and a combination of the measurement results; and
   receive, from the device, a plurality of signals in the plurality of cells, wherein the plurality of signals are received by the apparatus at a same time period and in cells at a same frequency with a same channel coding via shared data channels, and wherein the at least one indication is used by the device to formulate the plurality of signals.

2. The apparatus of claim 1, wherein the apparatus comprises a user equipment operative in the wireless communications network, and wherein the wireless communications network comprises a long term evolution wireless communications network.

3. The apparatus of claim 1, wherein the signal quality measurements comprise channel quality information.

4. The apparatus of claim 3, wherein the channel quality information comprise channel quality of a frequency range over which the wireless communications network operates for a number of different cells served by the device.

5. The apparatus of claim 1, wherein the plurality of signals comprise handoff-related signals.

6. The apparatus of claim 1, the memory and the computer program instructions being configured to, with the processor, cause the apparatus at least to further perform: combine the received plurality of signals.

7. The apparatus of claim 6, wherein when combining the received plurality of signals the apparatus approaches a predetermined threshold signal to interference plus noise ratio (SINR) for the received plurality of signals.

8. The apparatus of claim 7, wherein the predetermined threshold SINR for the received plurality of signals comprises a maximum SINR.

9. The apparatus of claim 1, the memory and the computer program instructions being configured to, with the processor, cause the apparatus at least to further perform: detect that a handoff-measurement event has been triggered based on a predetermined criterion, wherein the handoff-measurement event comprises performing the signal quality measurements in aid of a handoff.

10. The apparatus of claim 9, wherein the wireless communications network comprises a long term evolution wireless communications network, wherein the device comprises a serving evolved Node B (eNB), and wherein the signal quality measurements further comprise signal quality measurements for at least one other intra-eNB cell besides a currently serving eNB cell.

11. The apparatus of claim 10, the memory and the computer program instructions being configured to, with the processor, cause the apparatus at least to further perform: synchronize the apparatus to the at least one other intra-eNB cell prior to performing a signal quality measurement for the at least one other intra-eNB cell.

12. The apparatus of claim 10, wherein performing a signal quality measurement for the at least one other intra-eNB cell comprises receiving a pilot signal from the eNB at a position known to the apparatus, and performing a signal quality measurement on the pilot signal.

13. The apparatus of claim 9, wherein the predetermined criterion is that a signal quality measurement associated with a serving cell in which the apparatus is operating has fallen beneath a threshold level.

14. The apparatus of claim 1, further comprising a scheduler.

15. The apparatus of claim 1, the memory and the computer program instructions being configured to, with the processor, cause the apparatus at least to further perform: use signal quality information to determine appropriate resource blocks, timing and channel codes for use in receiving the plurality of signals from the device.

16. The apparatus of claim 1, where the wireless communications network comprises a long term evolution wireless communications network, wherein the device comprises a serving evolved Node B (eNB), and wherein the memory and the computer program instructions being configured to, with the processor, cause the apparatus at least to further perform: choose an optimal frequency locally using signal quality measurements from intra-eNB cells associated with the serving eNB; determine a resource block for each of the intra-eNB cells to transmit a signal to the apparatus; and transmit a measurement report to the serving eNB, where the measurement report includes only resource block information.

17. The apparatus of claim 16, wherein determining a resource block for each of the intra-eNB cells further comprises combining measured signal quality information of different intra-eNB cells at a same frequency bin in raw power level, and choosing a resource block with a strongest combined signal to interference plus noise ratio.

18. The apparatus of claim 16, wherein determining a resource block for each of the intra-eNB cells further comprises sorting signal quality information for different intra-eNB cells based on signal to interference plus noise ratio (SINR) and choosing a resource block with a strongest SINR within the intra-eNB cells.

19. A method comprising:
performing, by an apparatus, signal quality measurements for a plurality of cells served by a device operative in a wireless communications network that is not using soft handovers, wherein the performed signal quality measurements yield measurement results for the plurality of cells;
transmitting, by the apparatus, at least one indication to the device, wherein the at least one indication comprises at least one of the measurement results and a combination of the measurement results; and
receiving, by the apparatus, a plurality of signals in the plurality of cells, wherein the plurality of signals are received at a same time period and in cells at a same frequency with a same channel coding via shared data channels, and wherein the at least one indication is used by the device to formulate the plurality of signals.

20. The method of claim 19, further comprising: determining, using the signal quality measurements, a frequency band to be used by plurality of cells to transmit the plurality of signals; and transmitting an indication of the determined frequency band to the device.

21. The method of claim 19, wherein the signal quality measurements comprise signal to interference plus noise ratio for a frequency range over which the wireless communications network operates in the plurality of cells.

22. The method of claim 19, wherein the signal quality measurements are performed in response to detection of a handoff measurement event, wherein the plurality of cells comprises a serving cell, wherein the plurality of signals comprises multiple instances of a handover command that is formulated using the at least one indication.

23. An apparatus comprising:
a processor; and
a memory including computer program instructions, the memory and the computer program instructions being configured to, with the processor, cause the apparatus at least to:
receive at least one indication from a device operative in a wireless communications network that is not using soft handovers, wherein the at least one indication is for a plurality of cells served by the apparatus in the wireless communications network, wherein the at least one indication comprises at least one of measurement results for the plurality of cells and a combination of the measurement results;
schedule, based on the received at least one indication, a plurality of signals to be transmitted to the device in the plurality of cells; and
transmit the plurality of signals in the plurality of cells to the device, wherein the plurality of signals are transmitted at a same time period and in cells at a same frequency with a same channel coding via shared data channels, and wherein the at least one indication is used by the device to formulate the plurality of signals.

24. The apparatus of claim 23, wherein the apparatus comprises a base station operative in the wireless communications network and wherein the wireless communications network comprises a long term evolution wireless communications network.

25. The apparatus of claim 23, wherein the signal quality measurements comprise signal to interference plus noise ratio measurements for a frequency range over which the wireless communications network operates for a number of different cells served by the apparatus.

26. The apparatus of claim 23, wherein the apparatus performs frequency domain scheduling with an objective to optimize signal to interference plus noise ratio at the device for the plurality of signals transmitted in the plurality of cells.

27. The apparatus of claim 23, wherein the plurality of signals comprise multiple instances of a handoff command.

28. An apparatus comprising:
a processor; and
a memory including computer program instructions, the memory and the computer program instructions being configured to, with the processor, cause the apparatus at least to:
receive at least one indication from a device operative in a wireless communications network that is not using soft handovers, wherein the at least one indication is for a plurality of cells served by the apparatus in the wireless communications network, wherein the at least one indication comprises at least one of measurement results for the plurality of cells and a combination of the measurement results;
schedule, based on the received at least one indication, a plurality of signals to be transmitted to the device in the plurality of cells;
transmit the plurality of signals in the plurality of cells to the device, wherein the plurality of signals are transmitted at a same time period; and
select a frequency band deemed to have high power according to the at least one indication and to use a same frequency band to transmit the plurality of signals to the device in the plurality of cells.

29. The apparatus of claim 23, wherein the apparatus is configured to select the same time period that is used to transmit the plurality of signals to the device.

30. A method comprising:
- receiving at least one indication from a device operative in a wireless communications network that is not using soft handovers, wherein the at least one indication is for a plurality of cells served by an apparatus in the wireless communications network, wherein the at least one indication comprises at least one of measurement results for the plurality of cells and a combination of the measurement results,
- scheduling, by the apparatus, based on the received at least one indication, a plurality of signals to be transmitted to the device in the plurality of cells; and
- transmitting, by the apparatus, the plurality of signals in the plurality of cells to the device, wherein the plurality of signals are transmitted at a same time period and in cells at a same frequency with a same channel coding via shared data channels, and wherein the at least one indication is used by the device to formulate the plurality of signals.

31. A method comprising:
- receiving at least one indication from a device operative in a wireless communications network that is not using soft handovers, wherein the at least one indication is for a plurality of cells served by an apparatus in the wireless communications network, wherein the at least one indication comprises at least one of measurement results for the plurality of cells and a combination of the measurement results,
- scheduling, by the apparatus, based on the received at least one indication, a plurality of signals to be transmitted to the device in the plurality of cells;
- transmitting, by the apparatus, the plurality of signals in the plurality of cells to the device, wherein the plurality of signals are transmitted at a same time period; and
- determining, using at least the at least one indication, a frequency band, the same time period and a channel coding for the transmission of the plurality of signals.

32. A non-transitory computer-readable memory medium storing a computer program executable by an apparatus for performing operations, the operations comprising:
- performing signal quality measurements for a plurality of cells served by a device operative in a wireless communications network that is not using soft handovers, wherein the performed signal quality measurements yield measurement results for the plurality of cells;
- transmitting at least one indication to the device, wherein the at least one indication comprises at least one of the measurement results and a combination of the measurement results; and
- receiving a plurality of signals in the plurality of cells, wherein the plurality of signals are received at a same time period and in cells at a same frequency with a same channel coding via shared data channels, and wherein the at least one indication is used by the device to formulate the plurality of signals.

33. A non-transitory computer-readable memory medium storing a computer program executable by an apparatus for performing operations, the operations comprising:
- at least one indication from a device operative in a wireless communications network that is not using soft handovers, wherein the at least one indication is for a plurality of cells served by the apparatus in the wireless communications network, wherein the at least one indication comprises at least one of measurement results for the plurality of cells and a combination of the measurement results;
- scheduling based on the received at least one indication, a plurality of signals to be transmitted to the device in the plurality of cells; and
- transmitting the plurality of signals in the plurality of cells to the device, wherein the plurality of signals are transmitted at a same time period and in cells at a same frequency with a same channel coding via shared data channels, and wherein the at least one indication is used by the device to formulate the plurality of signals.

* * * * *